3,591,624
4-(SUBSTITUTED ARYL) CYCLOHEXENE-
CARBOXYLIC ACIDS
George Karmas, Bound Brook, N.J., and Alexander
Mebane, New York, N.Y., assignors to Ortho Pharmaceutical Corporation
No Drawing. Filed Aug. 22, 1967, Ser. No. 662,310
Int. Cl. C07c 69/76; A61k 27/00
U.S. Cl. 260—473                                                          2 Claims

ABSTRACT OF THE DISCLOSURE 4-(substituted aryl) cyclohexenecarboxylic acids, wherein the substituted aryl portion of the molecule is p-cyclopentoxyphenyl and o-tolyl, are useful as agents for the suppression of animal reproduction.

In a copending patent application U.S. Ser. No. 532,581, filed Mar. 8, 1966, there are disclosed a series of 4-arylcyclohexenecarboxylic acids which have activity as anti-littering agents. We have now found that animal reproduction is suppressed postcoitally by the compounds of the present invention having the formulae:

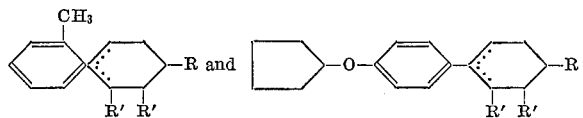

where R is carboxy, lower carbalkoxy, methanol, carboxamide and carboxylic alkali metal salts, and R' is lower alkyl of up to 6 carbon atoms, and wherein the dotted lines represent a double bond at either the 3- or the 4- position.

The compounds of the present invention are prepared by reaction of a 2-lower alkyl-3-lower alkyl-4-ketocyclohexanecarboxylic acid ester or lithium salt with an excess of the appropriately substituted aryl Grignard reagent or aryl lithium reagent, hydrolyzing the reaction product, and dehydrating with a strong acid such as p-toluenesulfonic acid monohydrate or iodine. When iodine is used, it is subsequently destroyed by the addition of sodium bisulfite. The 4-cyclohexenyl acid and 3-cyclohexenyl acid are separated by recrystallization.

The following examples illustrate the invention:

EXAMPLE I 2-methyl-3-ethyl-4-(p-cyclopentoxyphenyl)-3-cyclohexenecarboxylic acid p-Cyclopentoxyphenyl magnesium bromide is prepared under nitrogen from 25 g. of p-cyclopentoxyphenyl bromide and 5 g. of magnesium in 40 ml. of ether plus 70 ml. of tetrahydrofuran. This solution is stirred at 0° C. and a solution of 10 g. of the lithium salt of 2-methyl-3-ethyl-4-ketocyclohexanecarboxylic acid, prepared by the neutralization of the acid with one equivalent of lithium hydride in 60 ml. of tetrahydrofuran, is added over a period of ten minutes. The mixture is refluxed with stirring for two hours and is then cooled to 0° C., diluted with 300 ml. of ether, and hydrolyzed with dilute hydrochloric acid. The layers are separated, and the acidic products are extracted with three portions of 7% aqueous sodium hydroxide. The combined alkaline solution is acidified with dilute hydrochloric acid and is extracted with ether. The ether solution is dried over anhydrous magnesium sulfate and is then evaporated to an oily residue. The residue is dissolved in 50 ml. of acetic acid and is boiled for 10 minutes after the addition of 0.3 g. of p-toluenesulfonic acid monohydrate. The acetic acid solution is evaporated to a viscous residue, and the residue is recrystallized several times from aqueous acetone and then from ether to afford 2-methyl-3-ethyl-4-(p-cyclopentoxyphenyl) - 3-cyclohexenecarboxylic acid, M.P. 175–177° C.

Calcd. for $C_{21}H_{28}O_3$ (percent): C, 76.79; H, 8.59. Found (percent): C, 76.58; H, 8.30.

λλmax: 5.88, 8.07, 8.50, 10.16, 11.41, 12.07, 14.44μ (KBr).

NMR ($CDCl_3$): shows no vinyl H. Alkyl pattern is that of a 3-cyclohexenyl acid.

Following the procedure of Example I, there is also prepared:

2,3-dimethyl-4-(p-cyclopentoxyphenyl)-3-cyclohexenecarboxylic acid,
2,3-diethyl-4-(p-cyclopentoxyphenyl)-3-cyclohexenecarboxylic acid,
2-methyl-3-propyl-4-(p-cyclopentoxyphenyl)-3-cyclohexenecarboxylic acid,
2-propyl-3-hexyl-4-(p-cyclopentoxyphenyl)-3-cyclohexenecarboxylic acid, and
2,3-dihexyl-4-(p-cyclopentoxyphenyl)-3-cyclohexenecarboxylic acid.

EXAMPLE II 2-methyl-3-ethyl-4-(p-cyclopentoxyphenyl)-4-cyclohexenecarboxylic acid The reaction of p-cyclopentoxyphenyl magnesium bromide with the lithium salt of 2-methyl-3-ethyl-4-ketocyclohexanecarboxylic acid is performed following the procedure of Example I and the crude hydroxyacid product is isolated as an oily residue, as before. The hydroxyacid is stirred with 120 ml. of anhydrous ether and 12 ml. of boron trifluoride etherate is added. After this mixture has been maintained at 25° C. for five hours, it is shaken with ice and water. The aqueous phase is discarded and the ether solution is now extracted with three portions of 2% aqueous ammonium hydroxide. The combined alkaline solution is cooled and acidified with hydrochloric acid and then it is twice extracted with ether. After it has been washed three times with water, the combined ether solution is dried and evaporated to a crystalline residue. The latter is recrystallized from ether to afford 2-methyl-3-ethyl-4-(p-cyclopentoxyphenyl)-4-cyclohexenecarboxylic acid, M.P. 172–173° C.

Calcd. for $C_{21}H_{28}O_3$ (percent): C, 76.79; H, 8.59. Found (percent): C, 76.90; H, 8.48.

λλmax: 5.89, 8.07, 8.50, 10.03, 11.72, 12.04, 13.90μ (KBr).

NMR ($CDCl_3$): shows vinyl H at 5.60 p.p.m. and alkyl pattern of a 4-cyclohexenyl acid.

Following the procedure of Example II, there is also prepared:

2,3-dimethyl-4-(p-cyclopentoxyphenyl)-4-cyclohexenecarboxylic acid,
2,3-diethyl-4-(p-cyclopentoxyphenyl)-4-cyclohexenecarboxylic acid,
2-methyl-3-propyl-4-(p-cyclopentoxyphenyl)-4-cyclohexenecarboxylic acid,
2-propyl-3-hexyl-4-(p-cyclopentoxyphenyl)-4-cyclohexenecarboxylic acid, and
2,3-dihexyl-4-(p-cyclopentoxyphenyl)-4-cyclohexenecarboxylic acid.

EXAMPLE III 2-methyl-3-ethyl-4-(o-tolyl)-4-cyclohexenecarboxylic acid

Following the procedure of Example I, but using o-tolyl magnesium bromide, there is afforded upon recrystallization from aqueous acetone, 2-methyl-3-ethyl-4-(o-tolyl)-4-cyclohexenecarboxylic acid, M.P. 149–157° C.

Calcd. for $C_{17}H_{22}O_2$ (percent): C, 79.03; H, 8.58.
Found (percent): C. 79.62; H, 8.51.
λλmax: 5.87, 7.91, 8.80, 13.12, 13.72μ (KBr).
NMR ($CDCl_3$): shows vinyl H at 5.50 p.p.m.

Following the procedure of Example III, there is also prepared:

2,3-dimethyl-4-(o-tolyl)-4-cyclohexenecarboxylic acid,
2,3-diethyl-4-(o-tolyl)-4-cyclohexenecarboxylic acid,
2-methyl-3-propyl-4-(o-tolyl)-4-cyclohexenecarboxylic acid,
2-propyl-3-hexyl-4-(o-tolyl)-4-cyclohexenecarboxylic acid, and
2,3-dihexyl-4-(o-tolyl)-4-cyclohexenecarboxylic acid.

EXAMPLE IV 2-methyl-3-ethyl-4-(o-tolyl)-3-cyclohexenecarboxylic acid

Following the procedure of Example I, but using o-tolyllithium or o-tolyl magnesium bromide, the crude hydroxyacid is isolated as an oily ether residue. The hydroxyacid is dissolved in 150 ml. of acetic acid; 0.9 g. of p-toluenesulfonic acid is added and the mixture is refluxed for 3½ hours and then evaporated to remove acetic acid. The residue is dissolved in ether and acidic products are extracted by washing twice with 3% aqueous sodium hydroxide. After acidification of the combined alkaline solution, the carboxylic acid is extracted with ether. The oily residue obtained from evaporation of this ether solution is distilled under high vacuum to afford mixed acids as a brittle glass, B.P. 130–140° C. at 0.001 mm. Recrystallization of this distillate affords white granules of 2-methyl-3-ethyl-4-(o-tolyl)-3-cyclohexenecarboxylic acid, M.P. 108–115° C.

Calcd. for $C_{17}H_{22}O_2$ (percent): C, 79.03; H, 8.58.
Found (percent): C, 78.75; H, 8.72.
λλmax: 5.88, 8.00, 13.08, 13.70, 13.90, 14.46μ (KBr).
NMR ($CDCl_3$): shows the alkyl pattern of a 3-cyclohexenyl acid and only a small amoun tof vinyl H (ascribable to some contaminant Δ[4]-isomer).

Following the procedure of Example IV, there is also prepared:

2,3-dimethyl-4-(o-tolyl)-3-cyclohexenecarboxylic acid,
2,3-diethyl-4-(o-tolyl)-3-cyclohexenecarboxylic acid,
2-methyl-3-propyl-4-(o-tolyl)-3-cyclohexenecarboxylic acid,
2-propyl-3-hexyl-4-(o-tolyl)-3-cyclohexenecarboxylic acid, and
2,3-dihexyl-4-(o-tolyl)-3-cyclohexenecarboxylic acid.

EXAMPLE V

[2-methyl-3-ethyl-4-(o-tolyl)-4-cyclohexenyl-1]-methanol

A mixture of 100 mg of 2-methyl-3-ethyl-4-(o-tolyl)-4-cyclohexenecarboxylic acid, 200 mg. of lithium aluminum hydride and 5 ml. of tetrahydrofuran is stirred for 20 hours and is then poured onto ice. After acidification, the hydrolysis mixture is filtered, washing the filter cake with ether. The ether layer of the filtrate is separated, washed with dilute aqueous alkali, and then dried and distilled to afford [2-methyl-3-ethyl-4-(o-tolyl)-4-cyclohexenyl-1]-methanol as a colorless, viscous oil.

Calcd. for $C_{17}H_{24}O$ (percent): C, 83.55; H, 9.90.
Found (percent): C, 82.88; H, 9.74.
λλmax: 2,97, 9.50–9.70, 11.55; 13.23, 13.76μ.
NMR ($CDCl_3$): shows full vinyl H at 5.47 p.p.m.

Following the procedure of Example V, there is also prepared:

[2,3-dimethyl-4-(o-tolyl)-4-cyclohexenyl-1]-methanol,
[2,3-diethyl-4-(o-tolyl)-4-cyclohexenyl-1]-methanol,
[2-methyl-3-propyl-4-(o-tolyl)-4-cyclohexenyl-1]-methanol,
[2-propyl-3-hexyl-4-(o-tolyl)-4-cyclohexenyl-1]-methanol, and
[2,3-dihexyl-4-(o-tolyl)-4-cyclohexenyl-1]-methanol, Similarly, the corresponding Δ3-compounds are prepared.

EXAMPLE VI 2-methyl-3-ethyl-4-(o-tolyl)-4-cyclohexenecarboxamide

A mixture of 60 mg. of 2-methyl-3-ethyl-4-(o-tolyl)-4-cyclohexenecarboxylic acid and 3 ml. of thionyl chloride is boiled gently for 15 minutes and then it is evaporated and the residue is distilled to afford the acid chloride, a mobile yellow oil of B.P. 105–110° C. at 0.001 mm. The acid chloride is dissolved in 7 ml. of purified dioxane and to it is added 0.8 ml. of 28% aqueous ammonia. The clear solution is heated at 90° C. for 5 minutes and then it is evaporated and the residue in treated with water and ether. The ether phase is washed with aqueous alkali, dried and evaporated. The ether residue is recrystallized from hexane to afford 30 mg. of 2-methyl-3-ethyl-4-(o-tolyl) - 4 - cyclohexenecarboxamide, M.P. 105–110° C.

Calcd. for $C_{17}H_{23}ON$ (percent): C, 79.33; H, 9.01.
Found (percent): C, 79.30; H, 9.04.
λλmax: 2.89, 3.18, 5.97, 13.21, 13.70, 14.23, 14.72μ (KBr).
NMR ($CDCl_3$): shows vinyl H at 5.52 p.p.m. and broad $NH_2$ band at 5.80–6.60 p.p.m.

Following the procedure of Example VI, there is also prepared:

2,3-dimethyl-4-(o-tolyl)-4-cyclohexenecarboxamide,
2,3-diethyl-4-(o-tolyl)-4-cyclohexenecarboxamide,
2-methyl-3-propyl-4-(o-tolyl)-4-cyclohexenecarboxamide,
2-propyl-3-hexyl-4-(o-tolyl)-4-cyclohexenecarboxamide, and
2,3-dihexyl-4-(o-tolyl)-4-cyclohexenecarboxamide.

Similarly, the corresponding Δ[3]-compounds are prepared.

EXAMPLE VII n-Hexyl 2-methyl-3-ethyl-4-(o-tolyl)-4-cyclohexenecarboxylate

Following the procedure of Example VI, 140 mg. of the acid chloride is prepared and dissolved in 3 ml. of dry n-hexanol plus 1.5 ml. of pyridine. This clear solution is heated at 90° C. for 15 minutes and then 5 drops of water are added and heating is continued for 5 minutes more. The mixture is then diluted with ether and the separated ether solution is washed twice with aqueous alkali, dried and distilled to afford hexyl 2-methyl-3-ethyl-4-(o-tolyl)-4-cyclohexenecarboxylate, a pale yellow oil of B.P. 130–140° at 0.005 mm.

Calcd. for $C_{23}H_{34}O_2$ (percent): C, 80.65; H, 10.01. Found (percent): C, 79.93; H, 9.91.

$\lambda\lambda$max: 5.79, 8.27, 8.92, 13.20, 13.77$\mu$.

NMR (CDCl$_3$): shows vinyl H at 5.47 p.p.m.

Following the procedure of Example VII, there is also prepared:

n-hexyl 2,3-dimethyl-4-(o-tolyl)-4-cyclohexene-carboxylate,
n-hexyl 2,3-diethyl-4-(o-tolyl)-4-cyclohexene-carboxylate,
n-hexyl 2-methyl-3-propyl-4-(o-tolyl)-4-cyclohexene-carboxylate,
n-hexyl 2-propl-3-hexyl-4-(o-tolyl)-4-cyclohexene-carboxylate, and
n-hexyl 2,3-dihexyl-4-(o-tolyl)-4-cyclohexene-carboxylate.

Similarly, the corresponding $\Delta^3$-compounds are prepared.

EXAMPLE VIII 2-methyl-3-ethyl-4-(p-cyclopentoxyphenyl)-3-cyclohexenecarboxamide A mixture of 160 mg. of 2-methyl-3-ethyl-4-(p-cyclopentoxyphenyl)-3-cyclohexenecarboxylic acid and 5 ml. of thionyl chloride is boiled gently for 30 minutes and then it is evaporated under vacuum to a viscous residue of the crude acid chloride. The latter is dissolved in 5 ml. of purified dioxane and to it is added 0.6 ml. of 28% aqueous ammonia. The remainder of the reaction and the isolation of product is performed as in Example VI, and the product is recrystallized from acetone plus hexane to afford 120 mg. 2-methyl-3-ethyl-4-(p-cyclopentoxyphenyl)-3-cyclohexenecarboxamide, M.P. 211–212°.

Calcd. for $C_{21}H_{29}O_2N$ (percent): C, 77.07; H, 8.93. Found (percent): C, 77.30; H, 9.22.

$\lambda\lambda$max: 2.94, 3.13, 6.05, 8.04, 8.51, 10.09, 12.12$\mu$ (KBr).

NMR (CD$_3$CO$_2$D): 0.78, 0.89, 1.00; 1.00, 1.11 p.p.m.

Following the procedure of Example VIII, there is also prepared:

2,3-dimethyl-4-(p-cyclopentoxyphenyl)-3-cyclohexenecarboxamide,
2,3-diethyl-4-(p-cyclopentoxyphenyl)-3-cyclohexenecarboxamide,
2-methyl-3-propyl-4-(p-cyclopentoxyphenyl)-3-cyclohexenecarboxamide,
2-propyl-3-hexyl-4-(p-cyclopentoxyphenyl)-3-cyclohexenecarboxamide, and
2,3-dihexyl-4-(p-cyclopentoxyphenyl)-3-cyclohexenecarboxamide.

Similarly, the corresponding $\Delta^4$-compounds are prepared.

EXAMPLE IX n-Butyl 2-methyl-3-ethyl-4-(p-cyclopentoxyphenyl)-3-cyclohexenecarboxylate Following the procedure of Example VIII, 0.3 g. of the acid chloride is prepared and dissolved in 1.0 ml. of dry n-butanol plus 3 ml. of pyridine. The remainder of the reaction and the isolation of the ester is performed as in Example VII. Distillation affords 0.3 g. of n-butyl 2-methyl-3-ethyl-4-(p-cyclopentoxyphenyl)-3-cyclohexenecarboxylate, a pale yellow oil of B.P. 175–185° at 0.002 mm.

$\lambda\lambda$max: 5.79, 8.06, 8.51, 10.09, 12.07$\mu$.

NMR (CDCl$_3$): 0.76, 0.88, 1.00; 0.95, 1.06 p.p.m.

Following the procedure of Example IX, there is also prepared:

n-butyl 2,3-dimethyl-4-(p-cyclopentoxyphenyl)-3-cyclohexenecarboxylate,
n-butyl 2,3-diethyl-4-(p-cyclopentoxyphenyl)-3-cyclohexenecarboxylate,
n-butyl 2-methyl-3-propyl-4-(p-cyclopentoxyphenyl)-3-cyclohexenecarboxylate,
n-butyl 2-propyl-3-hexyl-4-(p-cyclopentoxyphenyl)-3-cyclohexenecarboxylate,
n-butyl 2,3-dihexyl-4-(p-cyclopentoxyphenyl)-3-cyclohexenecarboxylate,
n-hexyl 2-methyl-3-ethyl-4-(p-cyclopentoxyphenyl)-3-cyclohexenecarboxylate, and
n-octyl 2-methyl-3-ethyl-4-(p-cyclopentoxyphenyl)-3-cyclohexenecarboxylate.

Similarly, the corresponding $\Delta^4$-compounds are prepared.

EXAMPLE X

[2-methyl-3-ethyl-4-(p-cyclopentoxyphenyl)-4-cyclohexenyl-1]-methanol

Following the procedure of Example V, 0.5 g. of 2-methyl-3-ethyl-4-(p-cyclopentoxyphenyl)-4-cyclohexenecarboxylic acid is reduced with 0.9 g. of lithium aluminum hydride. The crude product is distilled to obtain a colorless glass of B.P. 145–155° at 0.005 mm., which crystallizes from hexane to afford 0.35 g. of [2-methyl-3-ethyl-4-(p-cyclopentoxyphenyl)-4-cyclohexenyl-1]-methanol, white prisms of M.P. 97–98°.

Calcd. for $C_{21}H_{30}O_2$ (percent): C, 80.21; H, 9.62. Found (percent): C, 80.24; H, 9.53.

$\lambda\lambda$max: 3.01, 8.06, 8.50, 9.70, 10.09, 11.91$\mu$ (KBr).

NMR (CDCl$_3$): 0.67, 0.78, 0.87, 0.90, 1.01 p.p.m.

Following the procedure of Example X, there is also prepared:

[2,3-dimethyl-4-(p-cyclopentoxyphenyl)-4-cyclohexenyl-1]-methanol,
[2,3-diethyl-4-(p-cyclopentoxyphenyl)-4-cyclohexenyl-1]-methanol,
[2-methyl-3-propyl-4-(p-cyclopentoxyphenyl)-4-cyclohexenyl-1]-methanol,
[2-propyl-3-hexyl-4-(p-cyclopentoxyphenyl)-4-cyclohexenyl-1]-methanol, and
[2,3-dihexyl-4-(p-cyclopentoxyphenyl)-4-cyclohexenyl-1]-methanol.

Similarly, the corresponding $\Delta^3$-compounds are prepared.

The alkali metal salts of the compounds of the invention are prepared by mixing equivalent amounts of the hexenyl acid and an alkali metal carbonate, bicarbonate or hydroxide in a solvent such as water or methanol until the neutralization reaction is complete. The reaction mixture is then evaporated to dryness to afford the alkali metal salt of the acid.

The activity of the compounds of the invention as agents for the suppression of reproduction is shown by their ability to prevent the implantation of the zygote in the uterus. This activity is demonstrated by permitting male and female rats of known fertility to cohabit and to determine copulation by the presence of sperm in the vagina. On the day of sperm in the vagina and on the following day, the female rats are given the compounds under test by gavage. Nine days later, the rats are autopsied and the uteri are observed for conceptuses. A control group of rats is similarly treated, except that they are not given the test compound.

Following the test procedure outlined above, total suppression of reproduction in rats is achieved with the administration of:

5 $\mu$g./kg. of body weight/day of 2-methyl-3-ethyl-4-(p-cyclopentoxyphenyl)-3-cyclohexenecarboxylic acid, and 900 $\mu$g./kg. of body weight/day of 2-methyl-3-ethyl-4-(o-tolyl)-4-cyclohexenecarboxylic acid.

What is claimed is:
1. A compound of the formula:

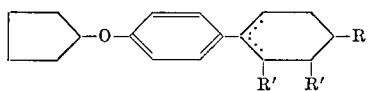

wherein R is lower carbalkoxy and R' is selected from the group consisting of lower alkyl of up to 6 carbon atoms, and wherein the dotted line represents a double bond in either the 3- or the 4-position.

2. n-Butyl 2-methyl-3-ethyl-4-(p-cyclopentoxyphenyl)-3-cyclohexenecarboxylate according to claim 1.

References Cited

UNITED STATES PATENTS

| 3,344,147 | 9/1967 | Mebane | 260—469X |
| 3,449,373 | 6/1969 | Mebane | 260—469X |

CHARLES B. PARKER, Primary Examiner

R. S. WEISSBERG, Assistant Examiner

U.S. Cl. X.R.

260—515, 520, 558, 559, 613, 618; 424—308